United States Patent
Tanaka et al.

[11] Patent Number: 6,026,251
[45] Date of Patent: Feb. 15, 2000

[54] CARTRIDGE OPERATING MECHANISM AND DEVICE EQUIPPED THEREWITH

[75] Inventors: Yoshiharu Tanaka, Kawachinagano; Junichi Tanii, Izumi, both of Japan

[73] Assignee: Minolta Co., Ltd., Osaka, Japan

[21] Appl. No.: 09/010,826

[22] Filed: Jan. 22, 1998

[30]  Foreign Application Priority Data

Jan. 24, 1997  [JP]  Japan .................................. 9-011109

[51] Int. Cl.$^7$ .................................................. G03B 17/00
[52] U.S. Cl. ............................................................ 396/538
[58] Field of Search .................................. 396/513, 514, 396/518, 538

[56] References Cited

U.S. PATENT DOCUMENTS 5,231,438  7/1993  Smart .
5,357,303  10/1994  Wirt .
5,761,559  6/1998  Yamazaki et al. .................. 396/538 X

FOREIGN PATENT DOCUMENTS 07043808  2/1995  Japan .
09211610  8/1997  Japan .
09211622  8/1997  Japan .

*Primary Examiner*—Howard B. Blankenship
*Attorney, Agent, or Firm*—McDermott, Will, Emery

[57] ABSTRACT

A mechanism which opens and closes a cover member of a IX240 cartridge film, the mechanism comprising a driver which possesses a first gear and interfaces with the aforementioned cover member, a crank cam which possesses a pin disposed off-center with respect to a rotational shaft and which rotates about said rotational shaft, and a crank lever possessing a slot into which the aforementioned pin may slide freely and a second gear which meshes with the aforementioned first gear, and wherein rotation of the aforementioned crank cam is propagated, via bi-directional pivoting of the aforementioned crank lever, as bi-directional pivoting of the aforementioned cartridge door driver.

12 Claims, 5 Drawing Sheets

CARTRIDGE OPERATING MECHANISM AND DEVICE EQUIPPED THEREWITH

This application is based on application No. Hei 9-11109 filed in Japan, the content of which is hereby incorporated by reference.

BACKGROUND OF THE INVENTION

1. Field of the Invention

The present invention relates to a mechanism which opens and closes by drivably rotating a cover member provided on a cartridge. In particular, the present invention relates to a film cartridge door operating mechanism which opens and closes the light lock door (termed "LLD" hereinafter) of an IX240 cartridge film used in an Advanced Photo System.

2. Description of the Related Art

U.S. Pat. No. 5,231,438 discloses an example of a camera equipped with an LLD opening and closing drive mechanism pertaining to a cartridge film akin to a cartridge film used in an Advanced Photo System. Said camera possesses a first latch supported so as to allow sliding, and a second latch (door driver) which has a linkage to an LLD and is supported on the same rotational shaft as an LLD. When said first latch is moved by an external control member, said second latch rotates, and simultaneously, an LLD is driven to open or close.

Since LLD opening and closing is two-way pivoting in this system, a crank mechanism can be employed as the mechanism for instances in which the unidirectional rotation of a motor serves as a drive source. Specifically, the drive mechanism comprises an LLD driver which possesses a pin disposed off-center with respect to a rotational shaft and which serves to open and close the LLD, a crank cam which similarly possesses a pin disposed off-center with respect to a rotational shaft and which is rotatably driven in one direction by the motor, and a crank lever which possesses a hole into which said crank cam pin may rotate freely, and a slot into which said LLD driver pin may slide freely.

In a design such as that described above, however, rotational motion is converted to sliding motion and once again converted to rotational motion, resulting in a poor torque transmission efficiency. In addition, the applied torque required for LLD rotation is substantial, favoring as much separation of the LLD driver pin from its rotational shaft as possible. On the other hand, the LLD must pivot back and forth through approximately 90°, which enlarges the stroke of the crank lever and results in a large mechanism.

SUMMARY OF THE INVENTION

In order to solve the aforementioned problems, the present invention provides a mechanism which opens and closes a cover member of a cartridge inserted in a cartridge chamber, said mechanism comprising a driver which possesses a first gear and interfaces with the aforementioned cover member of a cartridge inserted in a cartridge chamber, a crank cam which possesses a pin disposed off-center with respect to a rotational shaft and which rotates about said rotational shaft, and a crank lever possessing a slot into which the aforementioned pin may slide freely and a second gear which meshes with the aforementioned first gear, and wherein rotation of the aforementioned crank cam is propagated, via bi-directional pivoting of the aforementioned crank lever, as bi-directional pivoting of the aforementioned cartridge door driver.

This construction also provides that the aforementioned first gear is an external gear and the aforementioned second gear is an internal gear. In addition, said construction provides that a projection furnished on the aforementioned driver regulates the pivoting range of said driver by directly contacting a stopper furnished on the aforementioned camera body.

This construction also provides that the rotational center of the aforementioned crank lever is disposed between the rotational center of the aforementioned driver and the central region of the aforementioned cartridge chamber surface. In addition, said construction is so disposed that the distance from the rotational center of the aforementioned crank cam to the rotational center of the aforementioned cartridge spool driver is longer than the distance from the rotational center of the aforementioned crank lever to the rotational center of the aforementioned cartridge spool driver.

Adoption of the foregoing construction ensures that the drive transmission efficiency within the opening and closing mechanism is increased, while the opening and closing mechanism is designed compactly.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

Figure 1A:
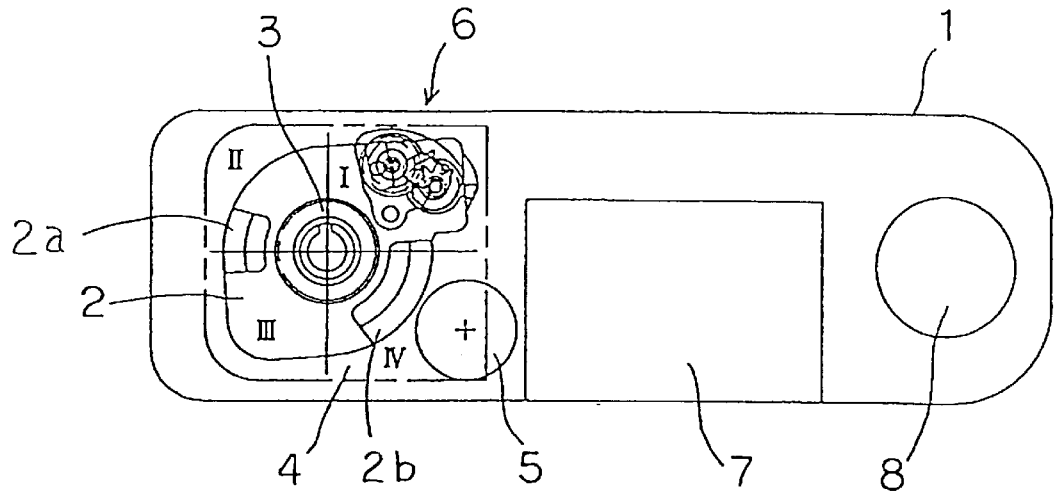
FIG. 1A is a brief plane view of a camera to which the present invention is applied.
Figure 1B:
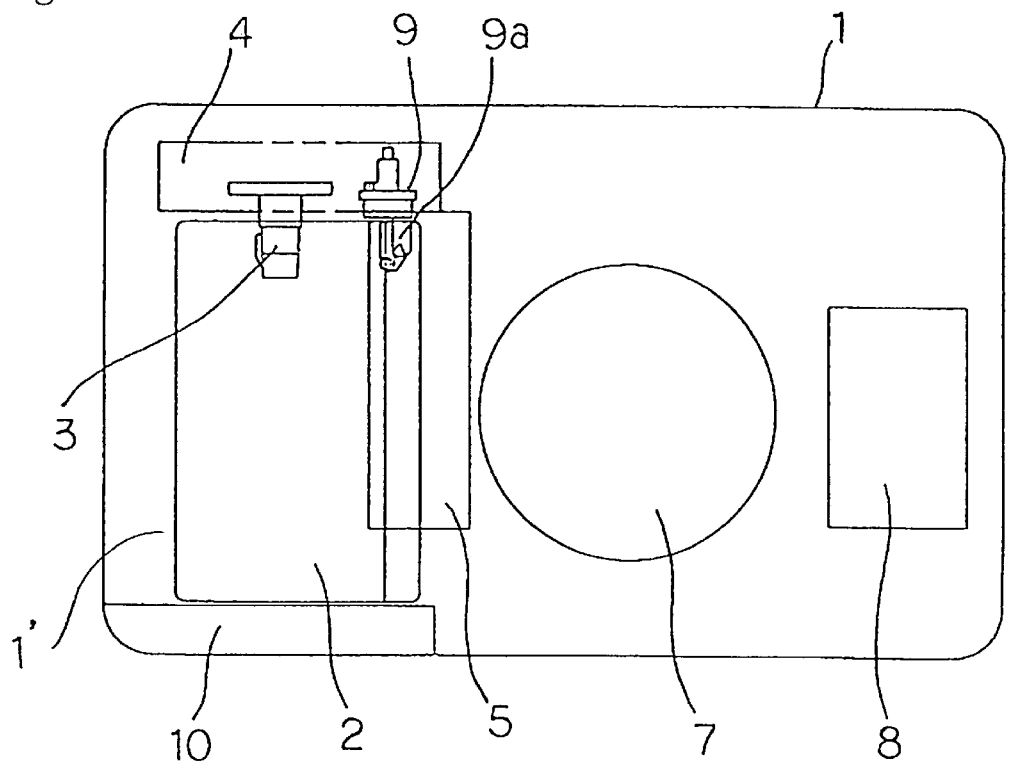
FIG. 1B is a brief front view thereof.

Preferred embodiments of the present invention are described hereinafter with reference to the drawings. FIG. 1A is a plane view which represents the principal component arrangement in one example of a camera pertaining to the present invention; FIG. 1B is a front view thereof. Numbered element 1 is a camera body, and 2 is an IX240 cartridge film; cartridge 2 is contained in cartridge chamber 1' shaped to match the exterior contour of cartridge 2. On cartridge 2 is a bar code which displays various information about the film so contained, and said bar code can be read through window areas 2a and 2b. Numbered element 3 is a cartridge spool driver which interfaces with the cartridge spool of cartridge 2 and carries out thrusting and rewinding of the film wound on said spool.

Numbered element 4 is a drive switching unit which carries out switching of operations; 5 is a motor which is connected to drive switching unit 4 and supplies drive power for various operations; and 6 is a door operating unit which provides drive to open and close the LLD (light lock door) of cartridge 2. Door operating unit 6 is contained within drive switching unit 4.

Numbered element 7 is a lens barrel used in photography; 8 is a wind-up spool which winds a film in the direction in which it is withdrawn; 9 is an LLD driver which is a structural element of door operating unit 6 and interfaces with an LLD to open and close said LLD; 9a is the actual linkage in said interface and is a door driver key integrated in a single unit with LLD driver 9; and 10 is a cartridge chamber cover. In such a design, unidirectional rotation of motor 5 provides drive to door operating unit 6.

Similarly, unidirectional rotation of motor 5 also carries out additional operations including film thrusting, wind-up, rewinding, and lock release of cartridge chamber cover 10; switching thereof is carried out by means of a planetary gear, crank, and cam, etc. within drive switching unit 4 but not illustrated.

Figure 8:
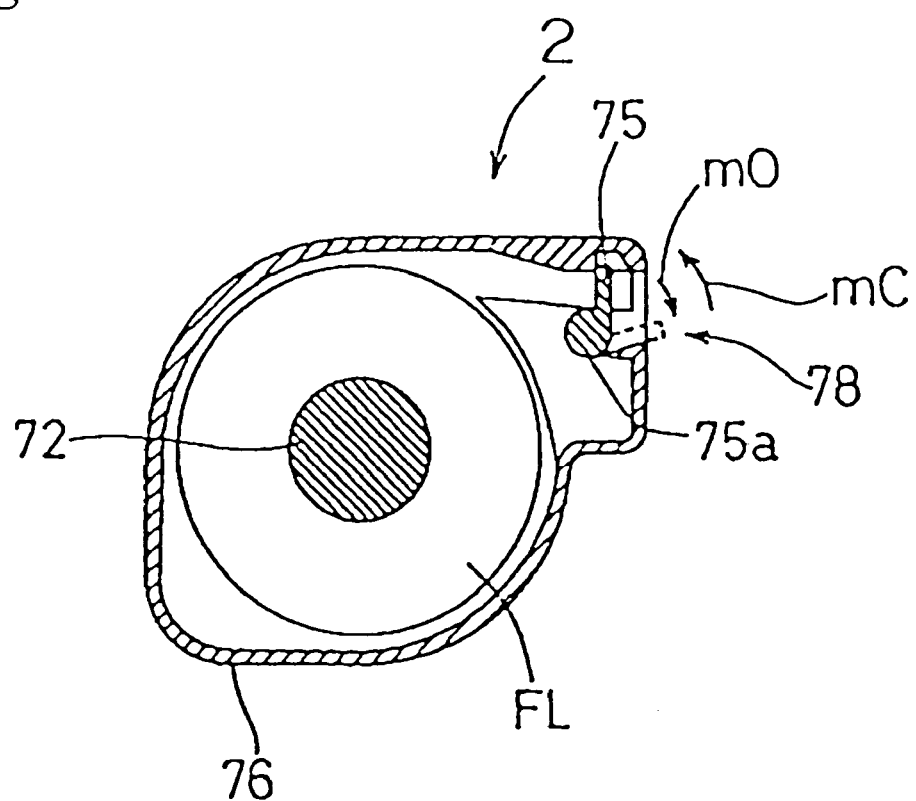
FIG. 8 is a horizontal cross-sectional view of a film cartridge.

The LLD of cartridge 2 is next described. FIG. 8 is a horizontal cross-section of IX240 cartridge film 2, which is usable in a camera implementing a preferred embodiment of the present invention. As shown in the figure, cartridge 2 possesses a hard shell structure comprising plastic cartridge casing 76 made from a plastic, and within cartridge casing 76 are provided cartridge spool 72, film FL wound onto cartridge spool 72, and LLD 75 which blocks light in film entrance/exit 78.

LLD 75 is retained in cartridge casing 76 at door interface areas provided at both axial ends of axial region 75a, and LLD 75 is designed to pivot freely in directions mO and mC indicated by arrows, in a fixed arc whose center is axial region 75a. Opening and closing of LLD 75 is carried out by the fact that LLD driver 9 is pivoted in a state wherein door driver key 9a is engaged in a key groove not illustrated but provided at the aforementioned door interface areas. The dotted lines in the figure indicate the position of LLD 75 in an open state.

Figure 2:
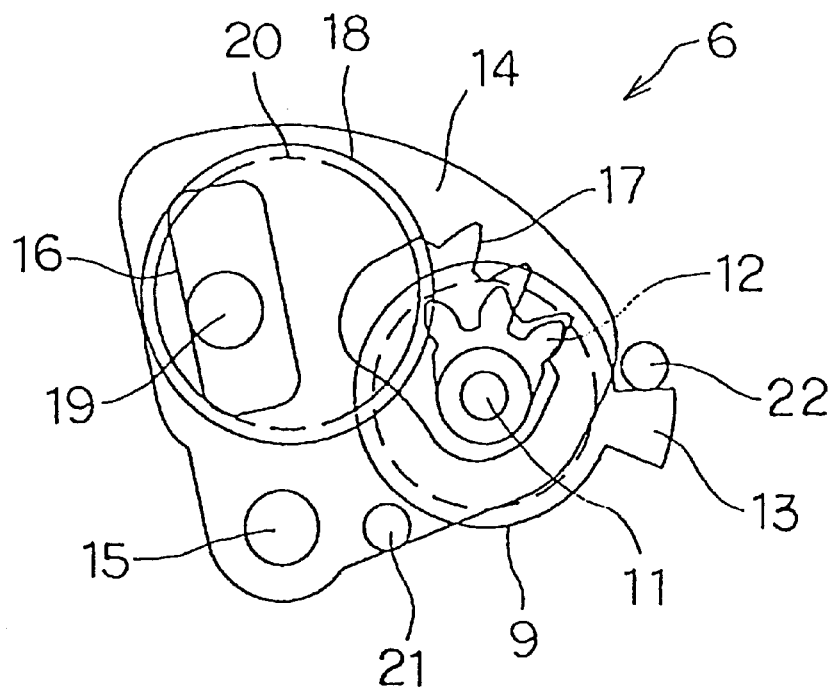
FIG. 2 is a representational drawing illustrating the structure of a door operating unit with the LLD in a closed state.

FIG. 2 is a drawing which represents the design of door operating unit 6, and said figure illustrates the position of various structural components in a state wherein LLD 75 is closed. As shown in the figure, intermittent gear 12 which is an external gear is provided on a plane surface of the aforementioned LLD driver 9; projection 13 is provided on the periphery of LLD driver 9; and these elements can pivot as a unit about rotational axis 11 supported by camera body 1. Thus, the pivoting range of LLD driver 9 is regulated by the fact that projection 13 directly contacts, respectively, pin-shaped opening stopper 21 and closing stopper 22 provided on said camera body.

Numbered element 18 is a crank cam, and crank cam gear 20 (indicated by its pitch circle, as per the broken line) provided peripheral thereto receives rotational drive power from the aforementioned motor 5 via drive switching unit 4 and rotates in one direction about a rotational axis supported by camera body 1 but not illustrated. Pin 19 is provided on said plane surface of crank cam 18 at a location off-center to the rotational axis thereof, and pin 19 rotates as a single unit with crank cam 18.

Numbered element 14 is a crank lever whereon slot 16 and internal gear 17 are provided, and these elements can rotate as a single unit about rotational axis 15 supported by camera body 1. In addition, the aforementioned pin 19 slides freely into slot 16, and the aforementioned intermittent gear 12 engages with internal gear 17. In this instance, the form is one wherein LLD driver 9 is disposed in proximity to the space occupied by crank lever 14. In a structure like that described above, LLD opening and closing is conducted by a continuous operation described hereafter.

Figure 3:
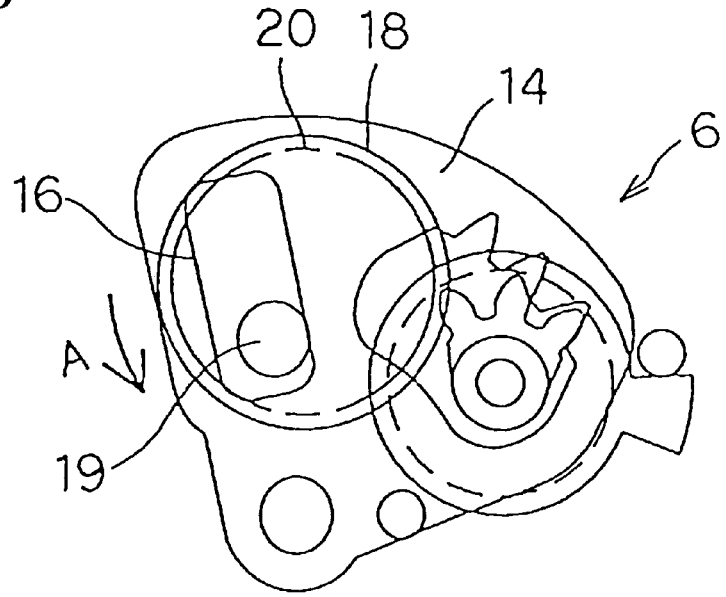
FIG. 3 is a drawing illustrating the initial rotational operation of a crank cam, from the LLD in a closed state.

FIG. 3 is a figure illustrating the initial rotational operation of the crank cam, from a state in which LLD 75 is closed. As shown in the figure, the rotation of crank cam 18 in the direction of arrow A rotates pin 19 in an off-center fashion, and said pin directly contacts the inner wall on the right side of slot 16 provided in crank lever 14.

Figure 4:
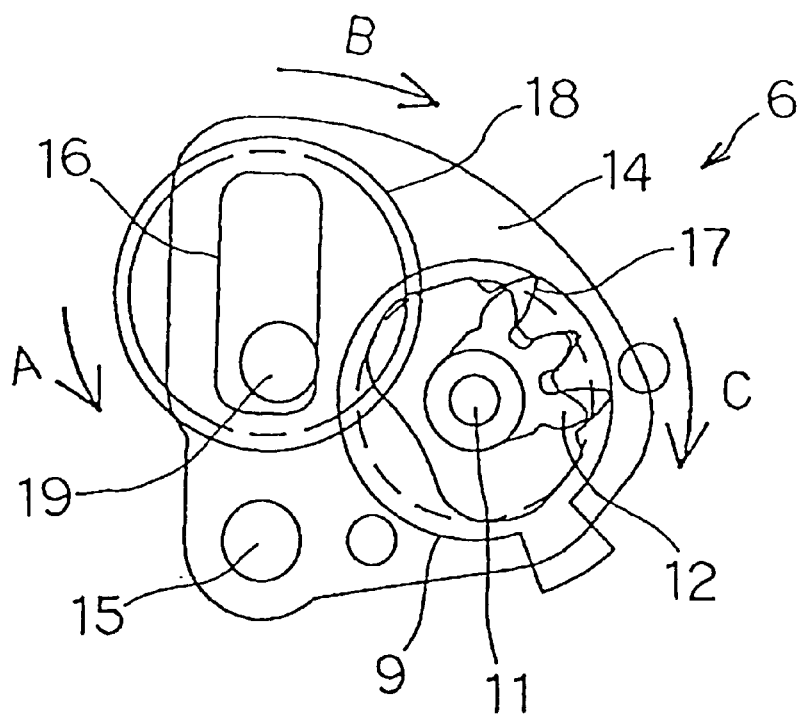
FIG. 4 is a drawing illustrating an operation driving the LLD in an opening direction.

FIG. 4 is a drawing illustrating an operation which drives LLD 75 in an opening direction. As shown in the figure, continued rotation of crank cam 18 in the direction of arrow A further rotates pin 19 in an off-center fashion, and said pin presses against the inner wall on the right side of slot 16. Therefore, crank lever 14 pivots about rotational axis 15 in the direction of arrow B, internal gear 17 simultaneously drives intermittent gear 12, and LLD driver 9 is pivoted about rotational axis 11 in the direction of arrow C.

Figure 5:
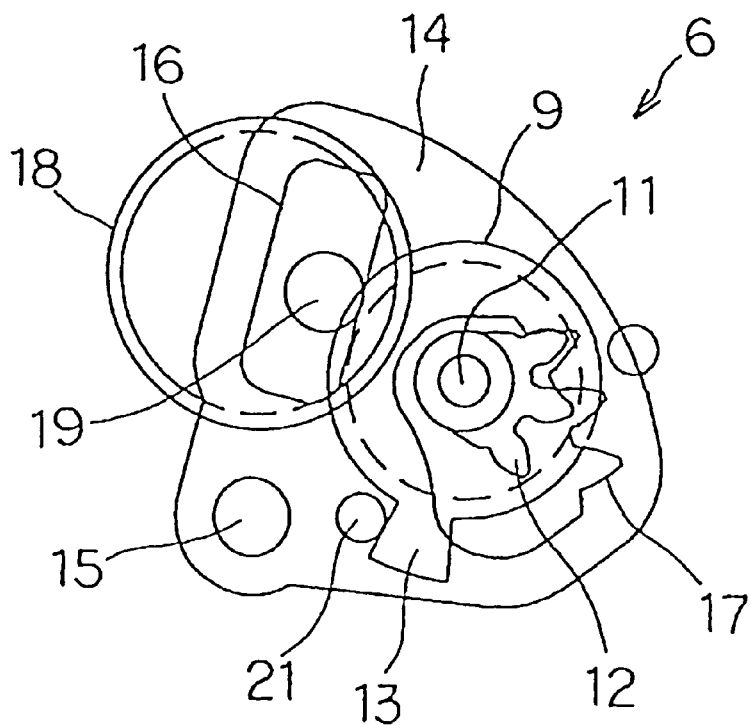
FIG. 5 is a drawing illustrating the position of various component parts with the LLD in an open state.

FIG. 5 is a drawing which illustrates the position of various structural components in a state wherein LLD 75 is open. As shown in the figure, when crank cam 18 rotates further from the state in FIG. 4 and presses against the inner wall on the right side of slot 16, and crank lever 14 pivots as far as possible to the right, internal gear 17 simultaneously drives intermittent gear 12, and LLD driver 9 is pivoted until projection 13 directly contacts opening stopper 21. Thus, with projection 13 in direct contact with opening stopper 21, the pivoting of LLD driver 9 is arrested, and LLD 75 assumes an open state.

Figure 6:
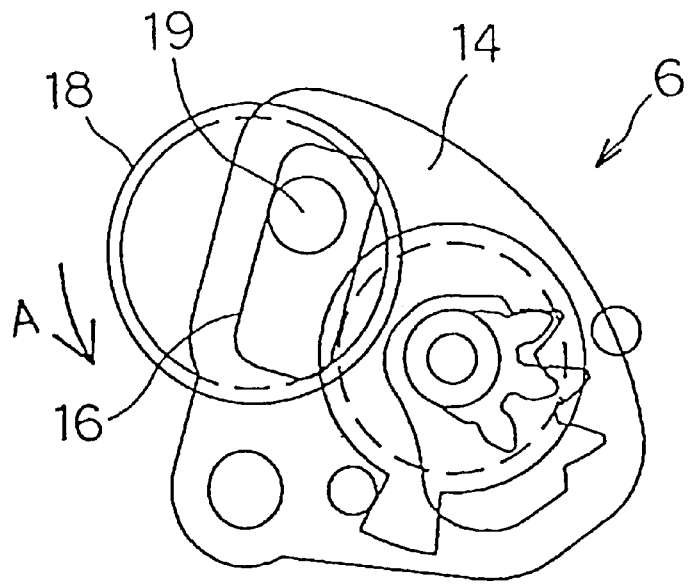
FIG. 6 is a drawing illustrating the initial rotational operation of the crank cam, from the LLD in an open state.

FIG. 6 is a figure illustrating the initial rotational operation of the crank cam, from a state in which LLD 75 is open. As shown in the figure, further rotation of crank cam 18 in the direction of arrow A from the state shown in FIG. 5 rotates pin 19 in an off-center fashion, and said pin directly contacts the inner wall on the left side of slot 16 provided on crank lever 14.

Figure 7:
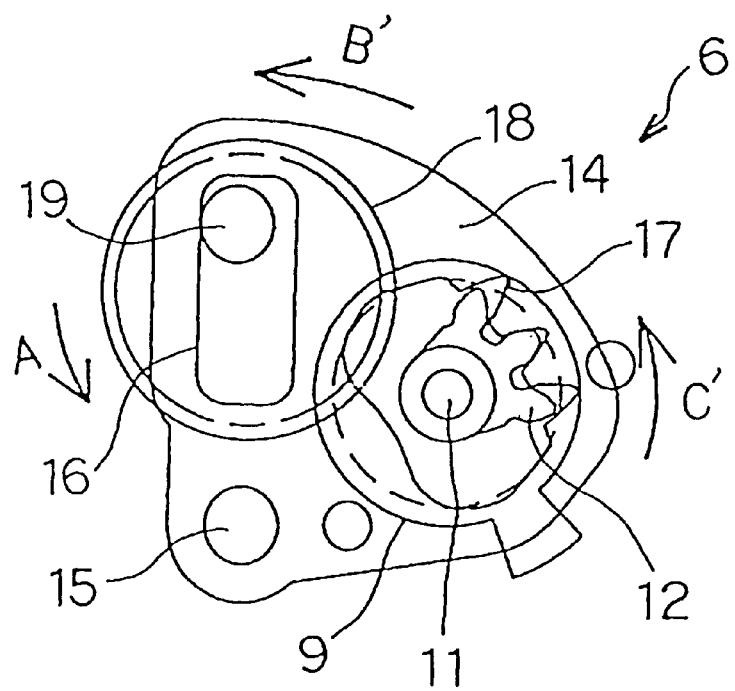
FIG. 7 is a drawing illustrating an operation driving the LLD in an closing direction.

FIG. 7 is a drawing illustrating an operation which drives LLD 75 in a closing direction. As shown in the figure, continued rotation of crank cam 18 in the direction of arrow A further rotates pin 19 in an off-center fashion, and said pin presses against the inner wall on the left side of slot 16; thus, crank lever 14 pivots about rotational axis 15 in the direction of arrow B', internal gear 17 simultaneously drives intermittent gear 12, and LLD driver 9 is pivoted about rotational axis 11 in the direction of arrow C'.

When crank cam 18 rotates further from the state in FIG. 7 and presses against the inner wall on the left side of slot 16, and crank lever 14 pivots as far as possible to the left, internal gear 17 simultaneously drives intermittent gear 12, and LLD driver 9 is pivoted until projection 13 directly contacts closing stopper 22. Thus, with projection 13 in direct contact with closing stopper 22, LLD driver 9 is arrested, and the closed LLD 75 state in FIG. 2 is regained. By means of the foregoing design, unidirectional rotation of motor 5 rotatably drives crank cam 18 in one direction and performs a continuous LLD opening and closing operation.

Herein, to ensure that projection 13 routinely contacts stopper 21 or 22 in the position pertaining to FIG. 3 or FIG. 5, a toggle spring may be used to impel LLD driver 9 in the direction of its pivoting endpoint.

In addition, as shown in FIG. 1A, among the aforementioned structural elements of door operating unit 6, rotational axis 15 of crank lever 14 is disposed between cartridge spool driver 3 and rotational axis 11 of LLD driver 9, and crank cam 18 and rotational axis 15 of crank lever 14 are disposed such that the distance between cartridge spool driver 3 and the rotational center of crank cam 18 is longer than the distance between cartridge spool driver 3 and rotational axis 15 of crank lever 14.

Thereby, as shown in FIG. 1A, the LLD drive mechanism of door operating unit 6 can be nearly contained within the profile of cartridge 2, and, said mechanism can be contained within quadrant I of cartridge 2. The use of the foregoing arrangement also affords space in quadrant II through quadrant IV of cartridge 2, and other mechanisms (e.g., a rewind mechanism, thrust mechanism, or bar code reading sensor for window regions 2a and 2b) can be provided therein, furthering miniaturization of a camera.

As described above, the present invention assumes a structure wherein the unidirectional rotation of a crank cam pivots a crank lever back and forth, and the small arc of the bi-directional pivoting of said crank lever causes an LLD driver to pivot back and forth in a large arc, such that all torque transmission is carried out through rotation or pivoting, and the crank lever stroke is small.

In addition, the present invention assumes a form wherein an internal gear of a crank lever engages an external gear (intermittent gear) of an LLD driver, and the LLD driver is disposed in proximity to the space occupied by the crank lever. These structures make it possible to offer a cartridge door operating mechanism that is both compact and transmits drive power with good efficiency.

Finally, the present invention is not limited to a camera and is also applicable to a film cartridge handling device such as a film scanner; in addition, the present invention can also be applied to a device which opens and closes a cartridge cover member by means of bi-directional pivoting.

Although preferred embodiment of the invention has been described in the foregoing detailed description and illustrated in the accompanying drawings, it will be understood that the invention is not limited to the embodiment disclosed, but is capable of numerous rearrangements, modifications and substitutions of parts and elements without departing from the spirit of the invention. Accordingly, the present invention is intended to encompass such rearrangements, modification and substitutions of parts and elements as fall within the spirit and scope of the invention.

What is claimed is:

1. A cartridge operating mechanism, comprising:
    a body having a cartridge chamber receiving a cartridge;
    a driver possessing a first connect portion and engaging with a cover member of a cartridge inserted in said cartridge chamber;
    a crank cam possessing a pin disposed off-center with respect to a rotational shaft and rotatable about said rotational shaft; and
    a crank lever possessing a slot slidably connected with said pin of the crank cam and a second connect portion engaged with said first connect portion.

2. A mechanism according to claim 1, wherein said first connect portion is an intermittent gear and said second connect portion is a gear.

3. A mechanism according to claim 2, wherein said first connect portion is an external gear and said second connect portion is an internal gear.

4. A mechanism according to claim 1, further comprising a stopper provided on said body and regulating a pivoting range of said driver.

5. A mechanism according to claim 1, wherein said crank lever provides a rotational center.

6. A mechanism according to claim 5, wherein said rotational center of the crank lever is disposed between a rotational center of the driver and a central region of said cartridge chamber surface.

7. A mechanism according to claim 5, wherein the distance between a rotational center of said driver and a central region of said cartridge chamber surface is longer than the distance between said rotational center of the crank lever and a central region of said cartridge chamber surface.

8. A camera which opens and closes by drivably rotating a cover member provided on a cartridge, the camera comprising:
    a body having a cartridge chamber receiving a cartridge;
    a driver possessing a first connect portion and engaging with a cover member of a cartridge inserted in said cartridge chamber;
    a crank cam possessing a pin disposed off-center with respect to a rotational shaft and rotatable about said rotational shaft; and
    a crank lever possessing a slot slidably connected with said pin of the crank cam and a second connect portion engaged with said first connect portion.

9. A camera according to claim 8, wherein said crank lever provides a rotational center.

10. A camera according to claim 9, wherein said rotational center of the crank lever is disposed between a rotational center of the driver and a central region of said cartridge chamber surface.

11. A camera according to claim 9, wherein the distance between a rotational center of said driver and a central region of said cartridge chamber surface is longer than the distance between said rotational center of the crank lever and a central region of said cartridge chamber surface.

12. A camera according to claim 9, wherein said first connect portion is an external gear and said second connect portion is an internal gear.

* * * * *